US010886596B2

(12) United States Patent
Yang et al.

(10) Patent No.: US 10,886,596 B2
(45) Date of Patent: Jan. 5, 2021

(54) WIRELESS COMMUNICATION DEVICE HAVING A TWO-PART ROTATABLE HOUSING WITH MULTIPLE ANTENNA CONDUCTORS

(71) Applicant: Motorola Mobility LLC, Chicago, IL (US)

(72) Inventors: Binbin Yang, Chicago, IL (US); Hariharan Muthukrishnan, Chicago, IL (US); Juan Martinez, Barrington, IL (US); Eric Krenz, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 21 days.

(21) Appl. No.: 16/296,698

(22) Filed: Mar. 8, 2019

(65) Prior Publication Data

US 2020/0287272 A1 Sep. 10, 2020

(51) Int. Cl.
*H01Q 1/38* (2006.01)
*H01Q 1/22* (2006.01)
(Continued)

(52) U.S. Cl.
CPC ........... *H01Q 1/2291* (2013.01); *H01Q 1/125* (2013.01); *H01Q 1/24* (2013.01); *H01Q 1/2266* (2013.01); *H01Q 1/38* (2013.01)

(58) Field of Classification Search
CPC .............................. H01Q 1/2266; H01Q 1/38
See application file for complete search history.

(56) References Cited

U.S. PATENT DOCUMENTS

| 8,576,136 B2 * | 11/2013 | Camacho | G06F 1/1616 343/702 |
| 9,236,648 B2 * | 1/2016 | Guterman | H01Q 1/2266 |

(Continued)

OTHER PUBLICATIONS

PCT International Search Report for PCT/IB2020/051994, Motorola Mobility LLC, dated Jun. 25, 2020.

*Primary Examiner* — Thuy Vinh Tran
(74) *Attorney, Agent, or Firm* — Loppnow & Chapa

(57) ABSTRACT

The present application provides a handheld wireless communication device. The handheld wireless communication device includes a two part housing having an upper housing and a lower housing, the upper housing and the lower housing being rotatably coupled together via a hinge. The upper housing and the lower housing through a relative movement via the hinge can transition between an opened position and a closed position. The lower housing has a first conductor including one or more tuned structures and has a second conductor including one or more tuned structures, where each of the tuned structures of the first conductor and the second conductor are adapted for at least one of transmitting or receiving electromagnetic energy having a respective predefined range of frequencies in support of wireless communications. The first conductor and the second conductor in a spaced apart fashion relative to each other are located proximate a first side edge of the lower housing, where the first side edge is opposite a second side edge of the lower housing, where the second side edge of the lower housing is the side edge of the lower housing, which is most directly coupled to the upper housing via the hinge.

18 Claims, 6 Drawing Sheets

(51) Int. Cl.
*H01Q 1/12* (2006.01)
*H01Q 1/24* (2006.01)

(56) References Cited

U.S. PATENT DOCUMENTS

| | | |
|---|---|---|
| 9,680,202 B2 * | 6/2017 | Irci ........................ H01Q 1/243 |
| 2005/0282593 A1 | 12/2005 | Spence et al. |
| 2007/0049326 A1 | 3/2007 | Kim |
| 2014/0169243 A1 | 6/2014 | Khlat et al. |
| 2018/0331714 A1 | 11/2018 | See et al. |

* cited by examiner

WIRELESS COMMUNICATION DEVICE HAVING A TWO-PART ROTATABLE HOUSING WITH MULTIPLE ANTENNA CONDUCTORS

FIELD OF THE APPLICATION

The present disclosure relates generally to multiple antenna conductors included as part of a wireless communication device having a two-part rotatable housing, and more particularly, to multiple antenna conductors, which are located proximate a common edge of one of the rotatable housings at an end that is opposite the edge coupled to the hinge, which connects the two housing parts.

BACKGROUND

Wireless communication devices are continuously integrating new and enhanced features, that leverage an ability to remotely transmit and receive data using wireless communication capabilities. As the features are added and/or enhanced, there often is a need to communicate wirelessly, an ever increasing amount of information/data in order to support the added and/or enhanced features of the device. This need for additional data throughput impacts both the overall operation of the network, as well as the data throughput relative to individual devices operating within the network.

The overall desire for higher data throughput for at least some cellular networks has led to at least some networks implementing support for a wider array of frequencies, as well as support for signal diversity. Signal diversity can allow for multiple copies of the same signal to be transmitted or received, where both versions of the signal are then used as part of the decoding of the signal at the recipient entity. For diversity, the structures used to transmit and/or receive the signals need to be sufficiently de-correlated, so as to allow both copies of the related signal to have information related to fading effects and interference that can be better isolated and accounted for.

In at least some instances, the space between antennas can affect the degree of correlation between them. However, sometimes device size and geometry can limit the degree to which antennas can be spaced apart within a device. Furthermore, co-locating multiple antennas within the same or restricted area can further affect the degree to which multiple antennas may mutually couple, which in turn can affect the operation of each of the antennas from the perspective of operating efficiency. Still further, where the housing of a device is intended to operate in multiple use configurations, such as at least both an opened and a closed configuration, depending upon where the antennas are positioned within the device, their spatial relationship may change, as the current use configuration of the device transitions between the multiple use position possibilities. Still further, during the transition between multiple use positions, the size and shape of supporting geometries may also change, including the size and shape of related ground structures. This may affect one or more of a desired range of frequencies.

For at least some devices it may be desirable to support multiple different sets of frequencies related to a particular form of communication. To the extent that multiple forms of communication are supported, there may be a need for still additional different ranges of frequencies. For example, in LTE (long term evolution) support for various combinations of low band frequency signals (i.e. 600 MHz-960 MHz), mid band frequency signals (i.e. 1700 MHz-2200 MHz), and high band frequency signals (i.e. 2300 MHz-2700 MHz) have been identified. Support for additional forms of communication can also include WIFI and/or Bluetooth having additional signals in a frequency range of 2400 MHz-2500 MHz, and WiFi 5G in the frequency range of 5000 MHz to 6000 MHz, as well as support for GPS (global positioning systems) having a frequency range of 1575 MHz to 1610 MHz. In addition to support for varying frequencies, it may be desirable for a particular direction of transmission and/or reception relative to one or more sets of signals to be supported, where for example it may be desirable for signals to be received from a generally upward direction, toward where one or more satellites supporting the particular form of communication may be in orbit.

The present innovators have recognized that grouping the antennas in a spaced apart manner, where their relative position does not change with the movement of multiple housings as the multiple housings transition between multiple use positions, may be beneficial. Further, the present innovators have recognized that it is possible to incorporate support for multiple different frequency ranges through a mix of antenna elements that include some of the antenna elements having a more direct physical connection. It would be further beneficial to be able to support additional antenna elements that are coupled to the transceiver/transmitter/receiver more indirectly through a parasitic coupling.

SUMMARY

The present application provides a handheld wireless communication device. The handheld wireless communication device includes a two part housing having an upper housing and a lower housing, the upper housing and the lower housing being rotatably coupled together via a hinge. The upper housing and the lower housing through a relative movement via the hinge can transition between an opened position and a closed position. The lower housing has a first conductor including one or more tuned structures and has a second conductor including one or more tuned structures, where each of the tuned structures of the first conductor and the second conductor are adapted for at least one of transmitting or receiving electromagnetic energy having a respective predefined range of frequencies in support of wireless communications. The first conductor and the second conductor in a spaced apart fashion relative to each other are located proximate a first side edge of the lower housing, where the first side edge is opposite a second side edge of the lower housing, where the second side edge of the lower housing is the side edge of the lower housing, which is most directly coupled to the upper housing via the hinge.

In at least one embodiment, the first conductor and the second conductor have a respective signal feed point, where the respective signal feed points of the first conductor and the second conductor are each coupled to one or more of a transceiver, a transmitter, and a receiver. In at least some of these instances, the one or more tuned structures of each of the first conductor and the second conductor includes a pair of branches that extend from each of the respective signal feed points.

In at least one embodiment, the first conductor includes a grounded parasitically coupled tuned structure and a floating parasitically coupled tuned structure, and the second conductor includes a grounded parasitically coupled tuned structure.

These and other features, and advantages of the present disclosure are evident from the following description of one or more preferred embodiments, with reference to the accompanying drawings.

DETAILED DESCRIPTION OF THE PREFERRED EMBODIMENT(S)

Figure 1:
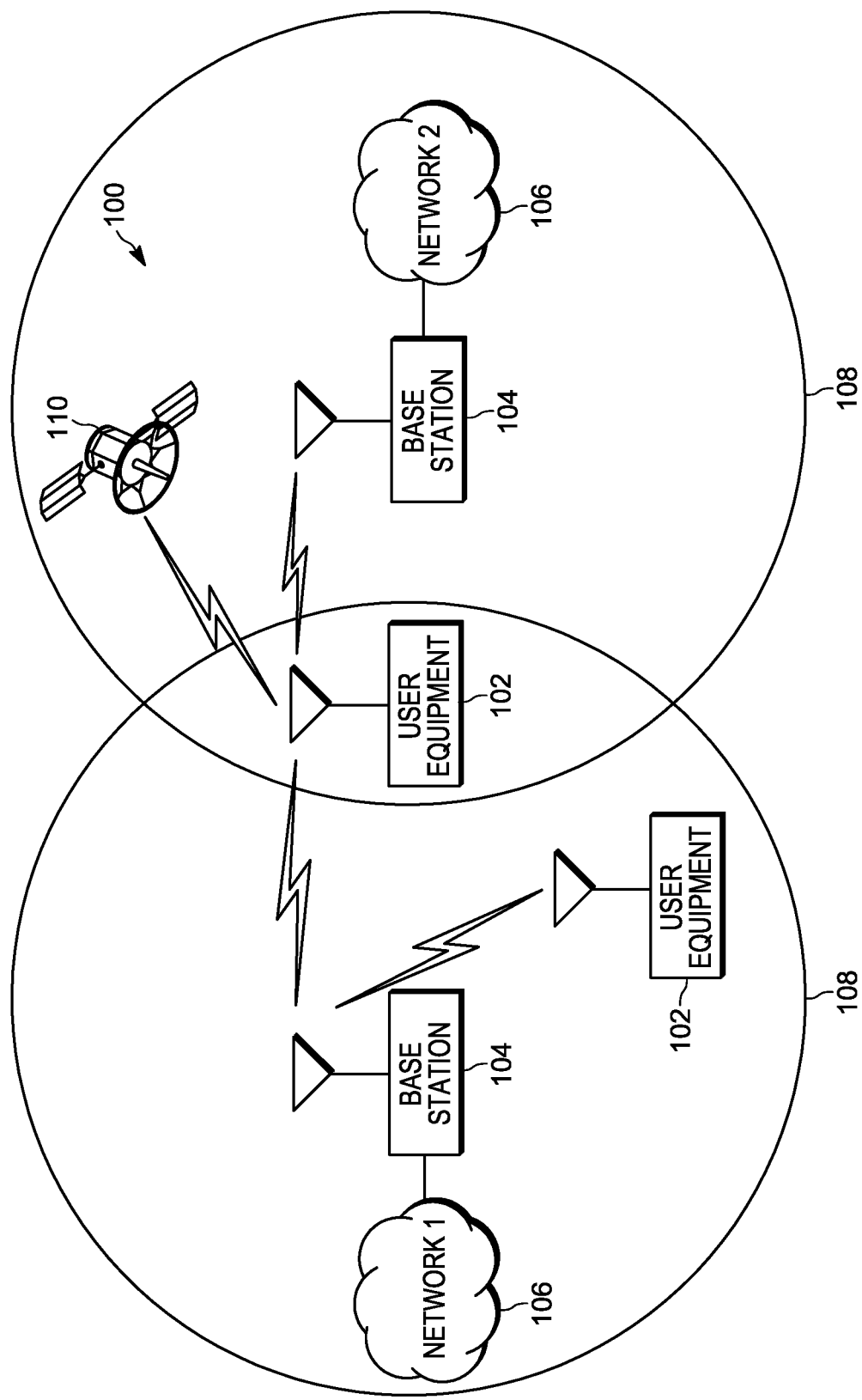
FIG. 1 is a block diagram of an exemplary network environment.

While the present invention is susceptible of embodiment in various forms, there is shown in the drawings and will hereinafter be described presently preferred embodiments with the understanding that the present disclosure is to be considered an exemplification and is not intended to limit the invention to the specific embodiments illustrated. One skilled in the art will hopefully appreciate that the elements in the drawings are illustrated for simplicity and clarity and have not necessarily been drawn to scale. For example, the dimensions of some of the elements in the drawings may be exaggerated relative to other elements with the intent to help improve understanding of the aspects of the embodiments being illustrated and described.

FIG. 1 illustrates a block diagram of an exemplary network environment 100. The exemplary network environment 100 can include one or more wireless communication devices, such as user equipment 102, which might communicate directly with one another, or via one or more networks, each having an associated network infrastructure. For example, the network infrastructure can include one or more base stations 104, which in turn are coupled to other network elements, which correspond to one or more networks, and which are generally represented as clouds labeled network 106. The various base stations 104 can be associated with the same network or can be separately associated with different networks.

A base station 104 will generally have an expected associated area 108 of coverage, which defines the area over which wireless radio frequency signaling from the base station can generally reach. While the strength of wireless radio frequency signaling is generally affected by the range of transmission, within an expected area of coverage, terrain and/or other physical elements can impact the ability of the signaling to be perceived at particular locations within the expected area 108 of coverage. Depending upon the reception capabilities of the user equipment 102, the current signal strength of the signal being transmitted at a particular location will affect whether a particular user equipment 102 can send or receive data with a particular base station 104. As such, some networks 106 will make use of multiple geographically spaced apart base stations 104, to provide communication capabilities across a larger geographical area.

It is further possible that different base stations 104 can be more directly associated with different networks 106, which may interact with one another at different parts of the respective networks. The network(s) 106 can include any type of network that is capable of conveying signals between different associated elements of the network including the one or more user equipment 102.

In some instances, the user equipment 102 is generally a wireless communication device that could take the form of a radio frequency cellular telephone. However, the user equipment 102 could also take the form of other types of devices that could support wireless communication capabilities. For example, the different potential types of user equipment can include a tablet, a laptop computer, a desktop computer, a netbook, a cordless telephone, a selective call receiver, a gaming device, a personal digital assistant, as well as any other type of wireless communication device that might be used to support wireless forms of communication. At least some of these may also qualify as being hand-held to the extent that they are intended to be operated in at least some of the corresponding use modes, while being held within the hand of the particular user that is more directly interacting with the device.

The various networks 106, base stations 104 and user equipment 102 could be associated with one or more different communication standards. A few examples of different communication standards that a particular network 106 could support include Global System for Mobile Communications (GSM), Code Division Multiple Access (CDMA), Orthogonal Frequency Division Multiple Access (OFDMA), Long Term Evolution (LTE), New Radio Access Technology (NR), Global Positioning System (GPS), Wi-Fi (IEEE 802.11), as well as various other communication standards. While many base stations 104 are ground based, in at least some instances, the user equipment 102 may be adapted for communicating with one or more satellites 110 in orbit, such as for receiving signals via which a position can be determined. It is possible that each network and/or associated element could support one or more different communication standards. It is also possible that different networks 106 can support one or more of the same standards. In addition, the wireless communication devices 102, base stations 104 and networks 106 may utilize a number of additional forms of communication and communication techniques including beamforming, signal diversity, and simultaneous voice and data that concurrently enables the use of simultaneous signal propagation.

Figure 2:
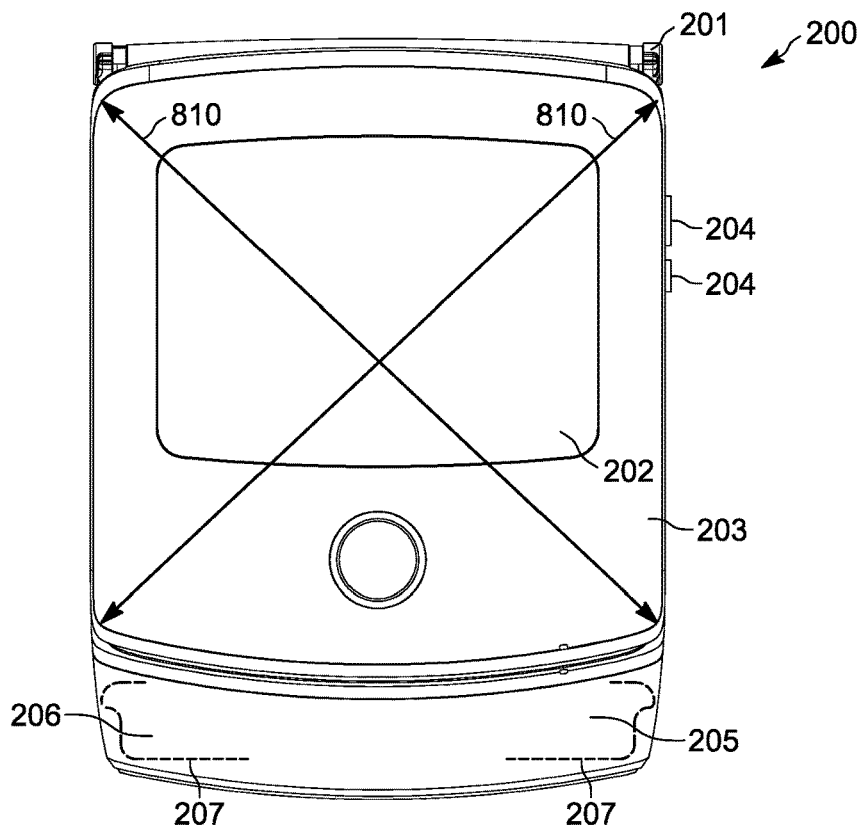
FIG. 2 is a front view of an exemplary hand-held wireless communication device, such as a radio frequency radio telephone in a closed use position.

FIG. 2 illustrates a front view 200 of an exemplary hand-held wireless communication device, such as a radio frequency radio telephone in a closed use position. In the illustrated embodiment, the radio frequency cellular telephone includes a display 202 which covers a large portion of the exposed outer surface of the upper housing 203, when the multiple housings of the two-part housing are arranged in a closed position. In the illustrated embodiment, the upper housing 203 when in a closed position relative to a lower housing 205, stops short of overlapping all of the lower housing 205. At least sometimes the non-overlapped portion of the lower housing 205 is referred to as a chin 206, where the non-overlapped portion can have an expanded thickness. The expanded thickness can allow for additional internal space within which various components can be located. The additional space can sometimes be used to accommodate more or larger elements, as well as allow for greater flexibility in the positioning and/or orientation of some of the elements, including greater flexibility in the placement of some elements relative to other elements. For example, the larger space can more readily accommodate multiple different spaced apart conductors 207, which can each serve as one or more antenna elements, where the relative position of the conductors 207 to one another may beneficially accommodate a reduced amount of mutual coupling, and/or antennas that are sufficiently de-correlated to better support signal diversity. In the illustrated embodiment, the upper housing 203 is rotatably coupled to the lower housing 205 via a hinge 201. In a closed use position, both the upper housing 203 and the lower housing 205 extend from the hinge 201 in a same or similar direction.

In at least some instances, the display 202 can incorporate a touch sensitive matrix, that can help facilitate the detection of one or more user inputs relative to at least some portions of the display, including an interaction with visual elements being presented to the user via the display 202. In some instances, the visual elements could include an object with which the user can interact. In other instances, the visual elements can form part of a visual representation of a keyboard including one or more virtual keys and/or one or more buttons with which the user can interact and/or select for a simulated actuation. In addition to one or more virtual user actuatable buttons or keys, the device can include one or more physical user actuatable buttons 204. In the particular embodiment illustrated, the device has two such buttons located along the right side of the device, with one of the buttons potentially functioning as a rocker switch.

Figure 3:
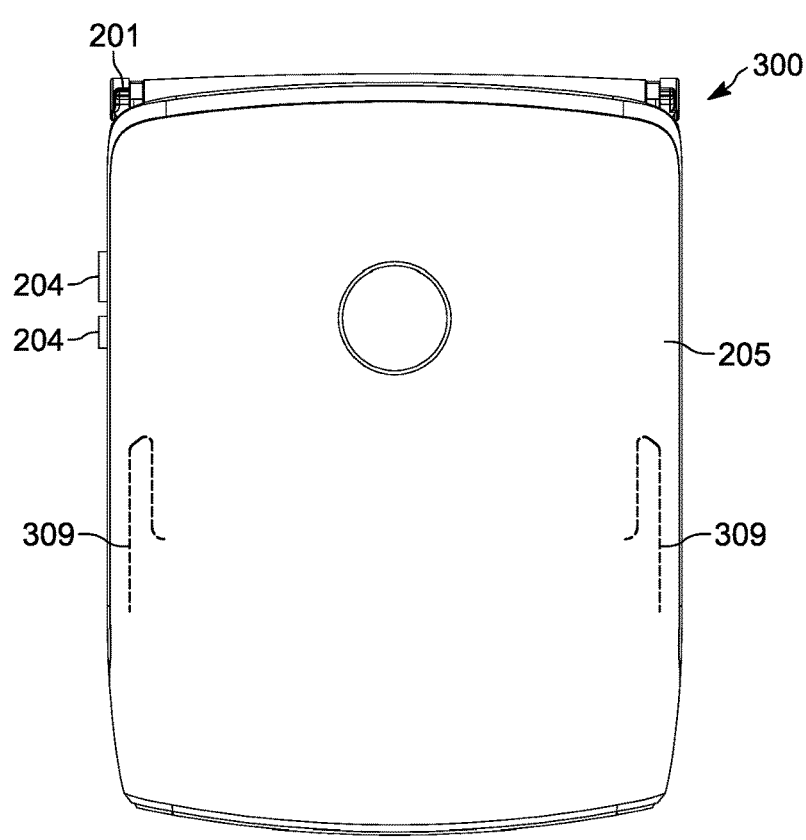
FIG. 3 is a back view of an exemplary hand-held wireless communication device in a closed use position.

FIG. 3 illustrates a back view 300 of an exemplary hand-held wireless communication device in a closed use position. In addition to the conductors 207 identified in chin area of the lower housing 205, the lower housing can include still further conductors 309 that can each function as one or more antenna elements. By including the antenna elements in the same lower housing 205 of the two part housing, the movement of the upper housing 203 relative to the lower housing will not affect the position of the antenna elements with respect to one another.

Figure 4:
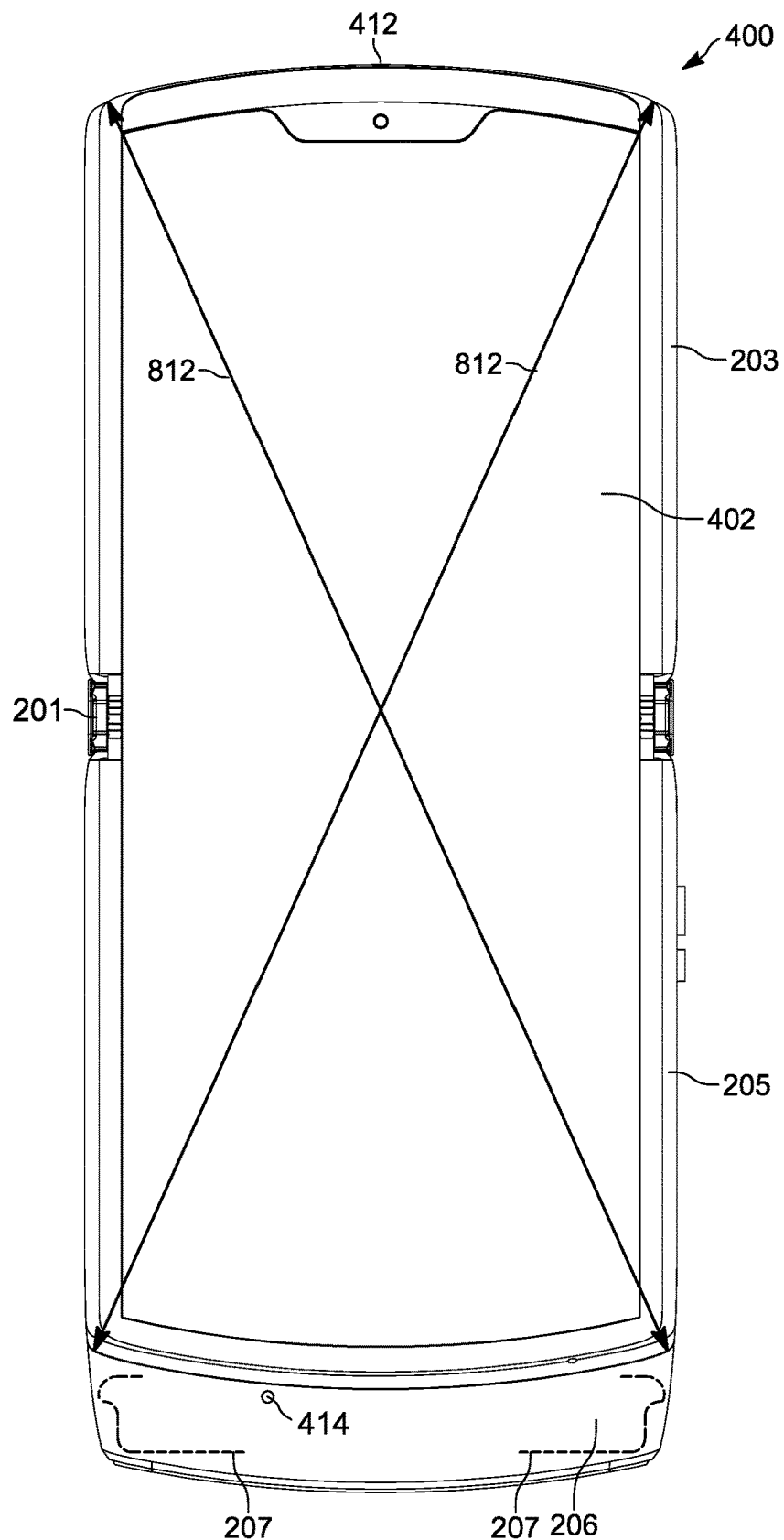
FIG. 4 is a front view of an exemplary hand-held wireless communication device, such as a radio frequency radio telephone in an opened use position.

FIG. 4 illustrates a front view of an exemplary hand-held wireless communication device, such as a radio frequency radio telephone in an opened use position. In the opened use position, both the upper housing 203 and the lower housing 205 extend from the hinge 201 in an opposite direction. In addition to the display 202 associated exclusively with the upper housing, when in an opened position, a further display 402 can be exposed. In the illustrated embodiment, the further display 402 extends across at least portions of both the upper housing 203 and the lower housing 205. In at least some instances, the display 402 will allow for bending, where when the device is in a closed use position, the display 402 can support a fold, which allows the display 402 to continue to follow the contour of the upper housing 203 and the lower housing 205, even as the housings rotate relative to one another.

The exemplary communication device, illustrated in FIG. 4, can additionally includes an ear piece speaker 412 and a microphone 414 in support of voice communications. In at least some instances the microphone 414 can be similarly incorporated in the chin portion 206 of the lower housing 205. Generally, the speaker 412 is located toward the top of the device, which corresponds to an orientation consistent with the respective portion of the device facing in an upward direction during usage in a portrait orientation in support of a voice communication. In such an instance, the speaker 412 might be intended to align with the ear of the user, and the microphone 414 might be intended to align with the mouth of the user. An additional alternative loud speaker may support the reproduction of an audio signal, which could be a stand-alone signal, such as for use in the playing of music, or can be part of a multimedia presentation, such as for use in the playing of a movie, which might have at least an audio as well as a visual component. The loud speaker could also be used to support hands free voice communications. The loud speaker may also include the capability to also produce a vibratory effect. However, in some instances, the purposeful production of vibrational effects may be associated with a separate element, not shown, which is internal to the device. In either case, the loud speaker and/or the vibrational element could also be located in the chin area 206 of the lower housing 205.

Figures 5, 6:
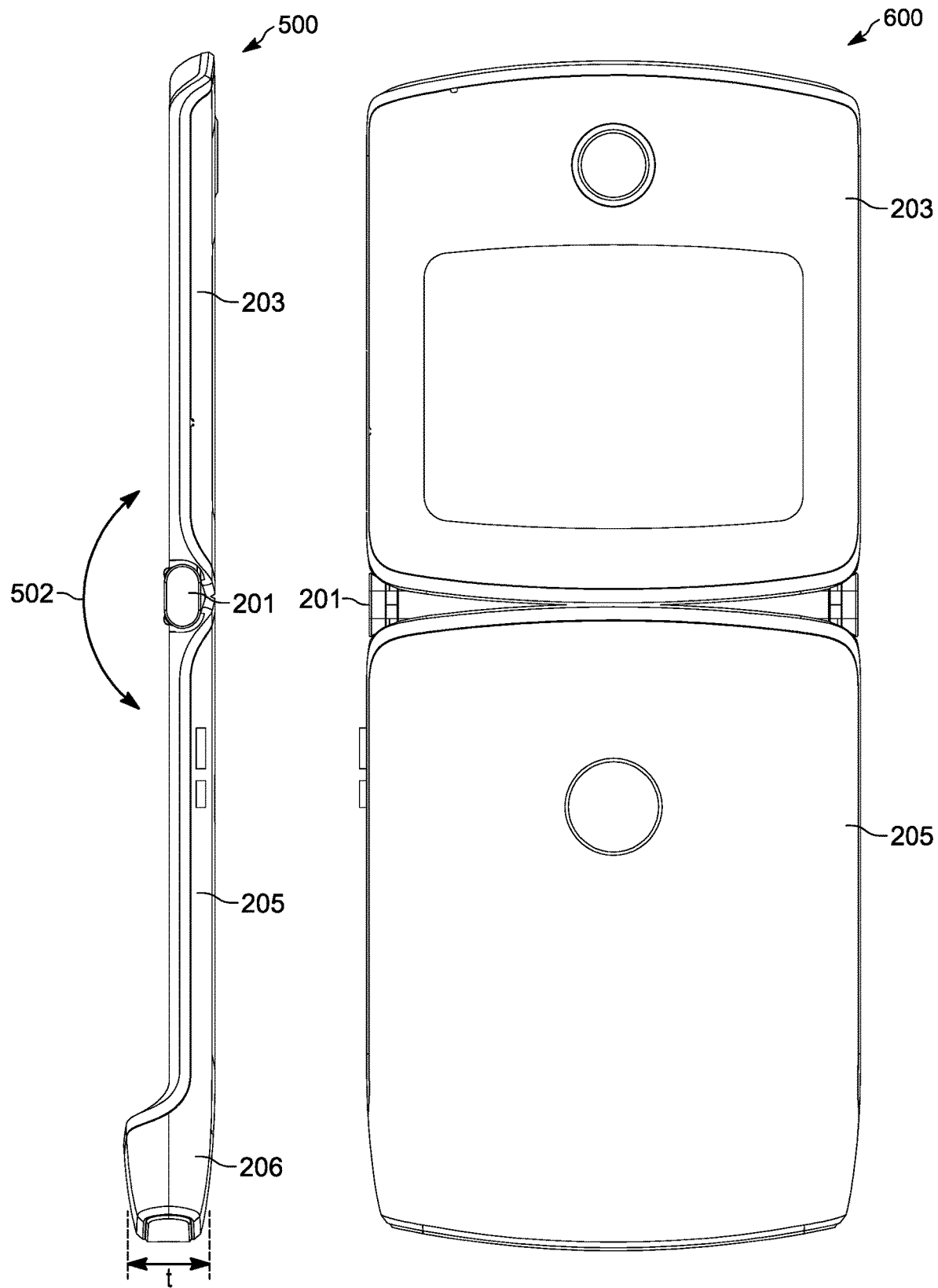
FIG. 5 is a side view of an exemplary hand-held wireless communication device in an opened use position.
FIG. 6 is a back view of an exemplary device in an opened use position.

FIG. 5 illustrates a side view 500 of an exemplary hand-held wireless communication device in an opened use position. An arrow 502 highlights the possible direction of relative movement, as the upper housing 203 rotates relative to the lower housing 205 between opened and closed use positions. The side view 500 further helps to highlight the expanded thickness 't' of the lower housing 205 in the area identified as the chin 206.

FIG. 6 illustrates a back view 600 of an exemplary device in an opened use position.

Figure 7:
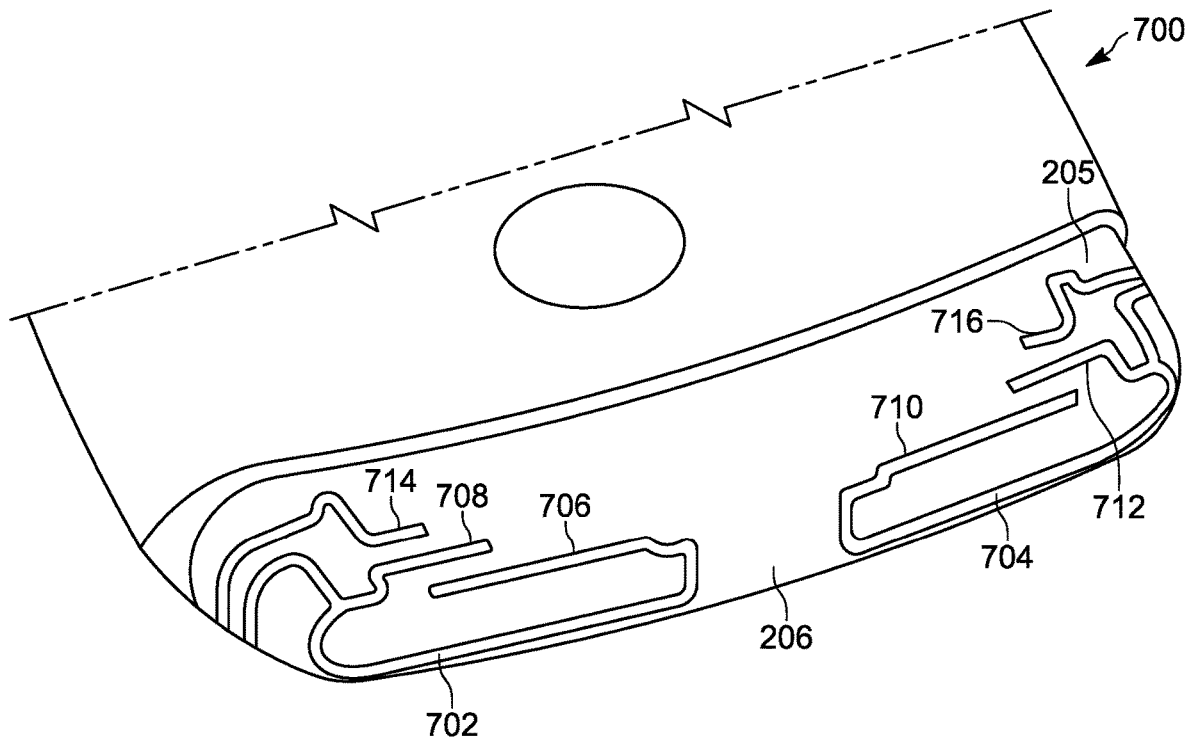
FIG. 7 is a partial front perspective view of an exemplary device, which highlights the end of the lower housing of the two part housing, which is opposite the hinge with the location of multiple conductors superimposed so as to illustrate at least one example of multiple antenna elements including the relative proximate position of the multiple antenna elements.

FIG. 7 illustrates a partial front perspective view 700 of an exemplary device, which highlights the end of the lower housing 205 of the two part housing, which is opposite the hinge with the location of multiple conductors superimposed so as to illustrate at least one example of multiple antenna elements including the relative proximate position of the multiple antenna elements. In the illustrated embodiment, the multiple antenna elements include a first conductor 702 and a second conductor 704, which are similar to the conductors 207, illustrated in FIGS. 2 and 4, which each can include one or more tuned structures. In the illustrated embodiment, the first conductor 702 includes a first tuned structure corresponding to a first branch 706 and a second turned structure corresponding to a second branch 708. The second conductor 704 similarly includes a first tuned structure corresponding to a first branch 710 and a second turned structure corresponding to a second branch 712.

A further conductor including a tuned structure 714 is parasitically coupled to the first conductor 702, and a still further conductor including a turned structure 716 is parasitically coupled to the second conductor 704. In addition to being parasitically coupled to a respective one of the first and second conductors, the turned structures 714 and 716 are also coupled to ground. The respective connection 802 to ground can be seen more clearly in FIG. 8. Alternatively, the first conductor 702 and the second conductor 704 are respectively coupled 804 to a signal feed of at least one of a transmitter, a receiver, or a transceiver.

Figure 8:
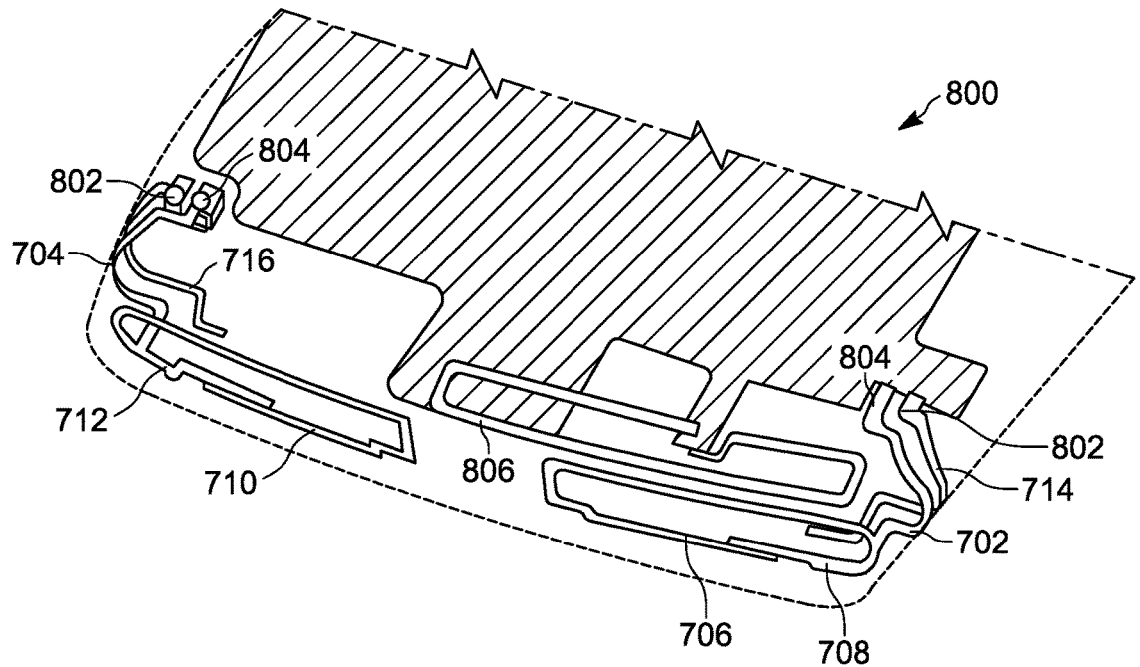
FIG. 8 is a partial internal back perspective view of an exemplary device highlighting the end of the lower housing of the two part housing, which is opposite the hinge where the exemplary location of the multiple conductors associated with multiple antenna elements is visible.

FIG. 8 illustrates a partial internal back perspective view 800 of an exemplary device highlighting the end of the lower housing of the two part housing, which is opposite the hinge where the exemplary location of the multiple conductors associated with multiple antenna elements is visible. In addition to the grounded parasitically coupled tuned structures, a floating parasitically coupled tuned structure 806 is illustrated. The floating parasitically coupled tuned structure is parasitically coupled to the first conductor 702.

In addition to the various antenna elements illustrated in FIGS. 7 and 8, other elements can similarly be located in the chin 206 of the lower housing 205. To the extent that any of these elements include conductive structures, such as structures formed from metal materials, the various antenna elements can be designed to take into account these other nearby conductive elements.

In at least one embodiments, the first one 706, 710 of the pair of branches for each of the first conductor 702 and the second conductor 704 support a communication of electromagnetic signals in a predesignated low band of operation of a cellular standard, such as LTE. The second one 708, 712 of the pair of branches for each of the first conductor 702 and the second conductor 704 support a communication of electromagnetic signals in a predesignated mid band of operation of a cellular standard, such as LTE. In each instance, one of the pair of branches relative to each of the different sets of frequency bands can serve as the primary or main antenna for the particular band, and support both transmit and receive, while the other one of the pair of branches relative to each of the different sets of frequency bands can serve as the diversity receive antenna element.

In the at least one embodiment, the grounded parasitically coupled tuned structure 714, which is associated with the first conductor 702, supports a communication of electromagnetic signals in a predesignated high band of operation of a cellular standard, such as LTE, and serves as the primary or main antenna for that particular band. The left antenna element 309 illustrated in FIG. 3, in at least some instances can serve as a diversity receive antenna element for the high band of operation.

In the at least one embodiment, the grounded parasitically coupled tuned structure 716, which is associated with the second conductor 704, supports a communication of electromagnetic signals in a wireless internet protocol standard, such as Wi-Fi (IEEE 802.11). The right antenna element 309 illustrated in FIG. 3, in at least some instances can serve as a WIFI MIMO (multiple input multiple output) antenna element for the wireless internet protocol standard.

The floating parasitically coupled tuned structure 806, which is associated with the first conductor 702, supports a communication of electromagnetic signals in a global positioning system, such as GPS. The antenna is shaped and placed to better transmit and receive signals from the upper hemisphere of the environment when the device is placed vertically.

While each of the antenna elements, in the illustrated embodiment, have been associated with a particular type of signal and/or a particular set of frequencies, one skilled in the art will readily appreciate, that the various antenna element could alternatively be tuned to function with a different set of frequencies and/or a different type of signals. For example, it would be readily possible to swap the antenna elements associated with the mid band diversity and the high band main, or swap the mid band main and the WIFI branches by changing the antenna lengths. Other changes would also be possible.

Relative to the antenna elements intended to operate in the low frequency band of operation of the corresponding cellular standard, the antenna elements can be influenced by the associated ground structure. In at least some instances, the corresponding ground structure is related to the orientation and arrangement of both the upper and lower housings, the hinge structure, as well as the current relative use position of the multiple housing parts. Correspondingly, the geometry of the ground structure can change, when the housing transitions between an opened and a closed use position. Relative to each of the related antenna elements, the ground structure dimension that is impactful is the respective length along the diagonal 810 and 812, as seen in FIGS. 2 and 4. An antenna tuner, can be used to help compensate for differences experienced between the ground structure lengths associated with each of the respective use positions. Furthermore, the difference in the directions of the respective diagonals, can help to de-correlate the two antennas associated with the low frequency band of operation. Further de-correlation can be supported by tuning the main low band antenna element closer to the transmit frequencies of the low frequency band of operation, while the low band receive diversity antenna element could be tuned closer to the designated receive frequencies of the low frequency band of operation.

Figure 9:
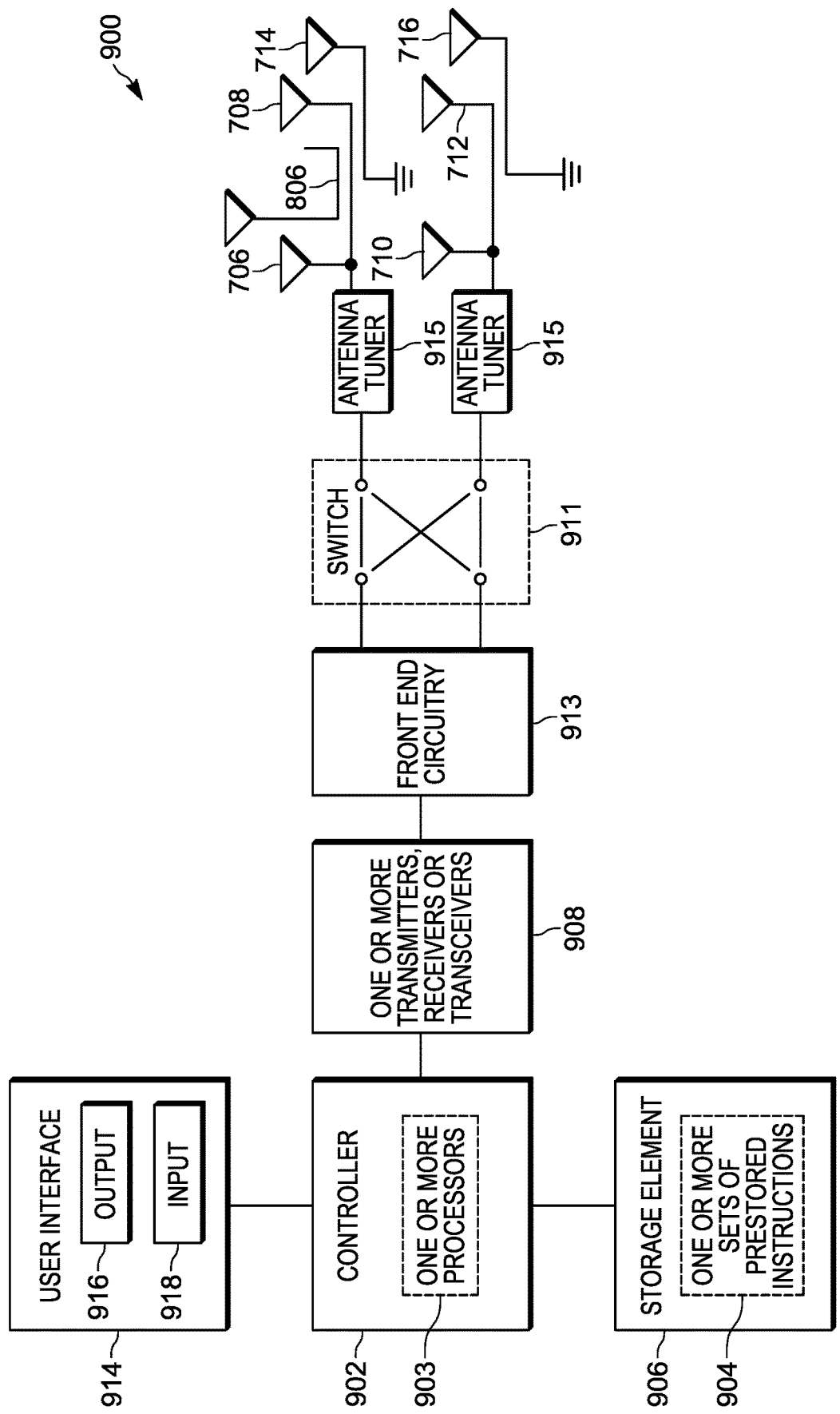
FIG. 9 is a block diagram of an exemplary wireless communication device.

FIG. 9 illustrates a block diagram 900 of an exemplary wireless communication device, in accordance with at least one embodiment. In the illustrated embodiment, the wireless communication device includes a controller 902, which is adapted for managing at least some of the operation of the device. In some embodiments, the controller 902 could be implemented in the form of one or more processors 903, which are adapted to execute one or more sets of pre-stored instructions 904, which may be used to form or implement the operation of at least part of one or more controller modules including those used to manage wireless communication and/or the coupling of wireless communication signals to one or more of the antenna elements. The one or more sets of pre-stored instructions 904 may be stored in a storage element 906, which while shown as being separate from and coupled to the controller 902, may additionally or alternatively include some data storage capability for storing at least some of the prestored instructions for use with the controller 902, that is integrated as part of the controller 902.

The storage element 906 could include one or more forms of volatile and/or non-volatile memory, including conventional ROM, EPROM, RAM, or EEPROM. The possible additional data storage capabilities may also include one or more forms of auxiliary storage, which is either fixed or removable, such as a hard drive, a floppy drive, or a memory card or stick. One skilled in the art will still further appreciate that still other further forms of storage elements could be used without departing from the teachings of the present disclosure. In the same or other instances, the controller 902 may additionally or alternatively incorporate state machines and/or logic circuitry, which can be used to implement at least partially, some of the modules and/or functionality associated with the controller 902 including all or portions of any claimed or discussed methods.

In the illustrated embodiment, the device further includes one or more transmitters, receivers or transceivers 908, which are coupled to the controller 902 and which serve to manage the external communication of data including their wireless communication using one or more forms of communications. In such an instance, the one or more transmitters, receivers or transceivers 908 will generally be coupled to one or more antenna elements, via which the wireless communication signals will be radiated and received. Transceivers, receivers and/or transmitters for other forms of communication are additionally and/or alternatively possible. In the present instance, the one or more receivers/transmitters/transceivers 908 are coupled to the one or more antenna elements via front end circuitry 913, as well as a switch 911, which can help to facilitate the one or more receivers/transmitters/transceivers 908, and the various transmit and receive paths supported therein interacting with various respective ones of the one or more antenna elements.

More specifically, the front end circuitry 913 and the switch 911 are intended to allow one or more transmitters, receivers or transceivers ports to be selectively coupled to one or more ports associated with the various antenna elements. Front end circuitry can often include various sub-elements, such as power amplifiers, filters, diplexers, duplexers and switches, which help to facilitate the coupling of a produced signal to an antenna element. The front end circuitry 913 can further include impedance matching elements and/or additional signal amplifiers, so as to more effectively manage the conveyance of signals between the one or more receivers/transmitters/transceivers 908 and the antenna elements. As previously noted, an antenna tuner 915 can be used with at least some of the signaling, such as signaling related to the low band of operation.

The switch 911 can be used to reverse the signals being conveyed to the spaced apart conductors. Such a reversal may be beneficial, in instances, where a user might be holding a device along one of the side edges. The particular edge being impacted may be related to which one of the user's right hand or left hand the user is using to hold the device. Depending upon which hand is holding the device, different portions of the user's hand, such as the palm, may be more closely encroaching upon one of the antenna elements. In such an instance, it may be beneficial to redirect (i.e. reverse) the signals related to a particular frequency band of operation between the main antenna element and the receive diversity antenna element. A switch 911 could be used to affect a reversal of the signals being applied to each of the respective antenna elements.

In the illustrated embodiment, the device can additionally include user interface circuitry 914, some of which can be associated with producing an output 916 to be perceived by the user, and some of which can be associated with detecting an input 918 from the user. For example, the user interface circuitry 914 can include the displays 202 and/or 402, which are adapted for producing a visually perceptible output, and which may further support a touch sensitive array for receiving an input from the user. The user interface circuitry may also include a speaker 412 for producing an audio output, and a microphone 414 for receiving an audio input. The user interface output 916 could further include a vibrational element. The user interface input 918 could further include one or more user actuatable switches 204, as well as one or more cameras. Still further alternative and additional forms of user interface elements may be possible.

In the illustrated embodiment, the device can still further include one or more sensors, which can be used for gathering status information relative to the operating environment as well as the manner in which the device is being used. For example, a sensor could be used to detect the presence of a user's hand more proximate one of the side edges of the device, a sensor could also be used to detect the current use position of the device including the relative movement of the two housing parts.

While the preferred embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A handheld wireless communication device comprising:
    a two part housing including an upper housing and a lower housing, the upper housing and the lower housing being rotatably coupled together via a hinge, wherein the upper housing and the lower housing through a relative movement via the hinge can transition between an opened position and a closed position;
    wherein the lower housing includes a first conductor including one or more tuned structures and a second conductor including one or more tuned structures, each of the tuned structures of the first conductor and the second conductor being adapted for at least one of transmitting or receiving electromagnetic energy having a respective predefined range of frequencies in support of wireless communications;
    wherein the first conductor and the second conductor in a spaced apart fashion relative to each other are located proximate a first side edge of the lower housing, where the first side edge is opposite a second side edge of the lower housing, the second side edge of the lower housing being the side edge of the lower housing, which is most directly coupled to the upper housing via the hinge;
    wherein the first conductor and the second conductor have a respective signal feed point, and wherein the respective signal feed points of the first conductor and the second conductor are each coupled to one or more of a transceiver, a transmitter, and a receiver; and
    wherein the one or more tuned structures of each of the first conductor and the second conductor includes a pair of branches that extend from each of the respective signal feed points.

2. The handheld wireless communication device of claim 1, wherein when in the opened position, the upper housing and the lower housing extend in respective directions away from the hinge in substantially opposite directions.

3. The handheld wireless communication device of claim 1, wherein when in the closed position, the upper housing and the lower housing each extend from the hinge in a same or substantially similar direction.

4. The handheld wireless communication device of claim 3, wherein when in the closed position, a front facing of the upper housing is rotated so as to be proximate to and overlap at least a portion of a front facing of the lower housing.

5. The handheld wireless communication device of claim 4, further comprising a bendable display that extends across at least portions of the front facing of the upper housing, the hinge, and the front facing of the lower housing.

6. The handheld wireless communication device of claim 4, wherein when in the closed position, the lower housing includes a portion that is not overlapped by the upper housing, and wherein the not overlapped by the upper housing portion of the lower housing is proximate the first side edge of the lower housing and has an expanded thickness.

7. The handheld wireless communication device of claim 6, wherein the first conductor and the second conductor are included in the expanded thickness of the lower housing.

8. The handheld wireless communication device of claim 1, wherein a first one of the pair of branches for each of the first conductor and the second conductor support a communication of electromagnetic signals in a predesignated low band of operation of a first cellular standard.

9. The handheld wireless communication device of claim 8, wherein the first one of the pair of branches for each of the first conductor and the second conductor, together, support received diversity for the predesignated low band of operation of the first cellular standard.

10. The handheld wireless communication device of claim 8, wherein the upper housing, the lower housing, and the hinge of the two-part housing, each include conductive portions that together serve as the ground for the first one of the pair of branches for the first conductor and the second conductor, which support the communication of electromagnetic signals in the predesignated low band of operation of the first cellular standard.

11. The handheld wireless communication device of claim 1, wherein a second one of the pair of branches for each of the first conductor and the second conductor support a communication of electromagnetic signals in a predesignated mid band of operation of a first cellular standard.

12. The handheld wireless communication device of claim 11, wherein the second one of the pair of branches for each of the first conductor and the second conductor, together, support received diversity for the predesignated mid band of operation of the first cellular standard.

13. The handheld wireless communication device of claim 1, wherein the first conductor includes a grounded parasitically coupled tuned structure, which supports a communication of electromagnetic signals in a predesignated high band of operation of a first cellular standard.

14. The handheld wireless communication device of claim 1, wherein the first conductor includes a floating parasitically coupled tuned structure, which supports a communication of electromagnetic signals in a global positioning system.

15. The handheld wireless communication device of claim 1, wherein the second conductor includes a grounded parasitically coupled tuned structure, which supports a communication of electromagnetic signals in a wireless internet protocol standard.

16. The handheld wireless communication device of claim 1, wherein the first conductor includes a grounded parasitically coupled tuned structure and a floating parasitically coupled tuned structure, and the second conductor includes a grounded parasitically coupled tuned structure.

17. A handheld wireless communication device comprising:
a two part housing including an upper housing and a lower housing, the upper housing and the lower housing being rotatably coupled together via a hinge, wherein the upper housing and the lower housing through a relative movement via the hinge can transition between an opened position and a closed position;
wherein the lower housing includes a first conductor including one or more tuned structures and a second conductor including one or more tuned structures, each of the tuned structures of the first conductor and the second conductor being adapted for at least one of transmitting or receiving electromagnetic energy having a respective predefined range of frequencies in support of wireless communications;
wherein the first conductor and the second conductor in a spaced apart fashion relative to each other are located proximate a first side edge of the lower housing, where the first side edge is opposite a second side edge of the lower housing, the second side edge of the lower housing being the side edge of the lower housing, which is most directly coupled to the upper housing via the hinge;
wherein the first conductor and the second conductor have a respective signal feed point, and wherein the respective signal feed points of the first conductor and the second conductor are each coupled to one or more of a transceiver, a transmitter, and a receiver; and
wherein the respective signal feed points of the first conductor and the second conductor are each coupled to the one or more of the transceiver, the transmitter, and the receiver via a switch, wherein the switch can respectively reverse a particular signal being applied to each of the respective signal feed points of the first conductor and the second conductor.

18. A handheld wireless communication device comprising:
a two part housing including an upper housing and a lower housing, the upper housing and the lower housing being rotatably coupled together via a hinge, wherein the upper housing and the lower housing through a relative movement via the hinge can transition between an opened position and a closed position;
wherein the lower housing includes a first conductor including one or more tuned structures and a second conductor including one or more tuned structures, each of the tuned structures of the first conductor and the second conductor being adapted for at least one of transmitting or receiving electromagnetic energy having a respective predefined range of frequencies in support of wireless communications;
wherein the first conductor and the second conductor in a spaced apart fashion relative to each other are located proximate a first side edge of the lower housing, where the first side edge is opposite a second side edge of the lower housing, the second side edge of the lower housing being the side edge of the lower housing, which is most directly coupled to the upper housing via the hinge; and
wherein a tuning of at least one of the one or more tuned structures of the first conductor is biased toward a receive set of frequencies in a particular frequency band of operation, and a tuning of at least one of the one or more tuned structures of the second conductor is biased toward a transmit set of frequencies in a particular frequency band of operation.

* * * * *